(12) United States Patent
Tsai

(10) Patent No.: US 8,334,850 B2
(45) Date of Patent: Dec. 18, 2012

(54) MULTI-TOUCH CONTROLLED APPARATUS AND METHOD THEREOF

(75) Inventor: Po Lei Tsai, Taipei (TW)

(73) Assignee: Mitac International Corp., Taoyuan (TW)

( * ) Notice: Subject to any disclaimer, the term of this patent is extended or adjusted under 35 U.S.C. 154(b) by 558 days.

(21) Appl. No.: 12/635,149

(22) Filed: Dec. 10, 2009

(65) Prior Publication Data

US 2010/0277432 A1 Nov. 4, 2010

(30) Foreign Application Priority Data

May 4, 2009 (TW) .............................. 98114760 A

(51) Int. Cl.
*G06F 3/045* (2006.01)
(52) U.S. Cl. ...................................................... 345/174
(58) Field of Classification Search .................... None
See application file for complete search history.

(56) References Cited

U.S. PATENT DOCUMENTS

| | | | | |
|---|---|---|---|---|
| 5,159,159 A | * | 10/1992 | Asher | 178/18.05 |
| 2005/0110769 A1 | * | 5/2005 | DaCosta et al. | 345/173 |
| 2009/0009482 A1 | * | 1/2009 | McDermid | 345/173 |

\* cited by examiner

*Primary Examiner* — Jason Olson
(74) *Attorney, Agent, or Firm* — WPAT, P.C.; Anthony King

(57) ABSTRACT

The present invention discloses a multi-touch controlled apparatus and the method thereof. The method of multi-touch control includes the steps of: touching a resistive touch display interface to generate a first position signal and a pressure signal; determining whether or not the pressure signal is greater than a predetermined pressure threshold; recording a first position signal and a second position signal if the pressure signal is greater than the predetermined pressure threshold; determining whether or not a moving direction from the first position signal towards the second position signal is the predetermined moving direction; and issuing an instruction to execute a predetermined action, if the moving direction from the first position signal towards the second position signal is the predetermined moving direction.

16 Claims, 3 Drawing Sheets

MULTI-TOUCH CONTROLLED APPARATUS AND METHOD THEREOF

BACKGROUND OF THE INVENTION

1. Field of the Invention

The present invention relates to a touch controlled apparatus and a method thereof, in particular to a multi-touch controlled apparatus and a method thereof.

2. Description of the Related Art

Touch panels available in the market can be categorized into two main types, respectively: a resistive touch panel and a capacitive touch panel according to their physical properties. The resistive touch panel generates a voltage signal when it is touched gently by a finger or any other similar objects, and the capacitive touch panel makes use of a tiny current of the finger (which is generally used in the touch panel of a laptop).

The outermost layer of the resistive touch panel is a polyester film, and a conductive metal coating is coated onto an internal side of the polyester film. And, the lowest layer of the screen is a glass plate coated with an electrically conductive material and attached onto a cathode ray tube (CRT) or a liquid crystal display (LCD). A layer containing separation dots and made of polyester is used for separating the glass plate and the polyester film. A pair of controllers is disposed in the direction along the X-axis of the glass plate and the Y-axis of the polyester film respectively. And, a tiny voltage gradient is applied thereto. If a screen is touched by a finger or a touch pen, then the two conductive layers will be pressed together and forms a touch point, and an electronic device can detect both of the X-coordinate and Y-coordinate of the touch point.

In general, a conventional touch panel having a multi-touch function is a capacitive touch panel adopting a complicated circuit. Both sides of the glass plate of the capacitive touch panel are coated with an electrically conductive material, and a scratch resistant coating is coated onto an external side of the glass plate. A uniform low-voltage electric field will be produced on the external conductive layer by the electrodes around the glass plate. The internal conductive layer can provide an electromagnetic interference (EMI) shielding to reduce noises. If the screen is touched by the finger, a capacitive coupling will be produced to absorb the tiny electric current of the finger by the electric field formed at the external conductive layer. Each electrode is responsible for measuring the electric current coming from each corner, and the controller determines the coordinates of the finger. Therefore, the electric field is changed to produce the capacitive coupling if the capacitive touch panel is contacted by the electrically conductor, and the current can be detected to determine the touch position. The capacitive touch panel simply depends on a contact of a human body or a tool having an electrically conductor to change the current to achieve the touch function that a general stylus fails to achieve.

Unlike the capacitive touch panel, the resistive touch panel can achieve a single touch only, but not the multi-touch function, due to the structure of the resistive touch panel. With reference to FIG. 1 for a flow chart of a conventional single touch method, the single touch method comprises the following steps:

In Step S11, a touch controlled display interface is touched by a user. In Step S12, a first position signal (a coordinate) is generated to represent the first position by an analog-to-digital converter of an encoder/decoder (or codec). Step S13 it is determined that whether or not the user leaves the touch display interface. If yes, then Step S14 the touch display interface waits for being touched for another time, or else, the procedure returns to Step S12.

In view of the aforementioned shortcomings of the prior art, the inventor of the present invention based on years of experience in the related industry to conduct extensive researches and experiments, and finally developed a multi-touch controlled apparatus and a method thereof as a basis to overcome the shortcomings of the prior art.

SUMMARY OF THE INVENTION

Therefore, it is a primary objective of the present invention to provide a multi-touch controlled apparatus and a method thereof, wherein the resistive touch design of the invention can achieve the functions similar to the multi-touch functions of the capacitive touch design. If a pressure signal induced by a user who presses a touch display interface is greater than a predetermined pressure threshold, then an instruction will be issued by a processing unit to execute a predetermined action according to a moving direction from the first position towards the second position, the first position and the second position are represented respectively by a first position signal and a second signal generated by the touch display interface, wherein the predetermined action includes zooming in a display screen, zooming out a display screen or moving a display screen in the moving direction from the first position towards the second position, etc.

To achieve the foregoing objective, the present invention provides a method of multi-touch control, comprising the steps of: generating a first position signal and a pressure signal while a resistive touch display is being touched, the first position signal representing a first position; determining whether or not the pressure signal is greater than a predetermined pressure threshold; if yes, then storing the first position signal and a second position signal representing a second position, the second position being moved from the first position; and determining whether or not the moving direction from the first position towards the second position is a predetermined moving direction; if yes, then issuing an instruction to execute a predetermined action.

To achieve the foregoing objective, the present invention provides a multi-touch controlled apparatus, comprising a resistive touch display interface, a storage unit and a processing unit. The resistive touch display interface is arranged for generating a first position signal, a pressure signal and a second position signal. The first position signal and the second position signal represent a first position and a second position respectively, and the second position is moved from the first position. The storage unit is arranged for storing the first position signal, the second position signal, a predetermined pressure threshold, a predetermined moving direction and a predetermined action in a storage unit. The processing unit is arranged for issuing an instruction. Wherein, the first position signal and the pressure signal are generated while the resistive touch display interface is being touched. The processing unit determines whether or not the pressure signal is greater than the predetermined pressure threshold, and if yes, the processing unit records the first position signal and the second position signal into the storage unit. And then the processing unit determines whether or not the moving direction from the first position towards the second position is the predetermined moving direction, and if yes, the processing unit issues the instruction to execute the predetermined action.

In summary, a multi-touch controlled apparatus and a method thereof in accordance with the present invention may have one or more of the following advantages:

(1) The multi-touch controlled apparatus and the method thereof in accordance with the present invention can achieve the multi-touch function by the resistive touch display interface. The invention not only provides a simple and easy function, but also reduces the cost of using the capacitive touch display interface.

(2) By means of the two-point touch and one-point moving, the multi-touch controlled apparatus and the method thereof in accordance with the present invention achieves the function that the single-touch device fails to achieve, and provides an operation much easier than the single-touch device to improve the convenience of using the multi-touch controlled apparatus and the method thereof.

To make it easier for our examiner to understand the technical characteristics and effects of the present invention, we use preferred embodiments together with related drawings for the detailed description of the invention as follows.

DETAILED DESCRIPTION OF THE PREFERRED EMBODIMENTS

The multi-touch controlled apparatus and the method thereof in accordance with the present invention are illustrated by the following drawings, wherein same numerals are used for representing same respective elements to facilitate the illustration.

Figure 1:
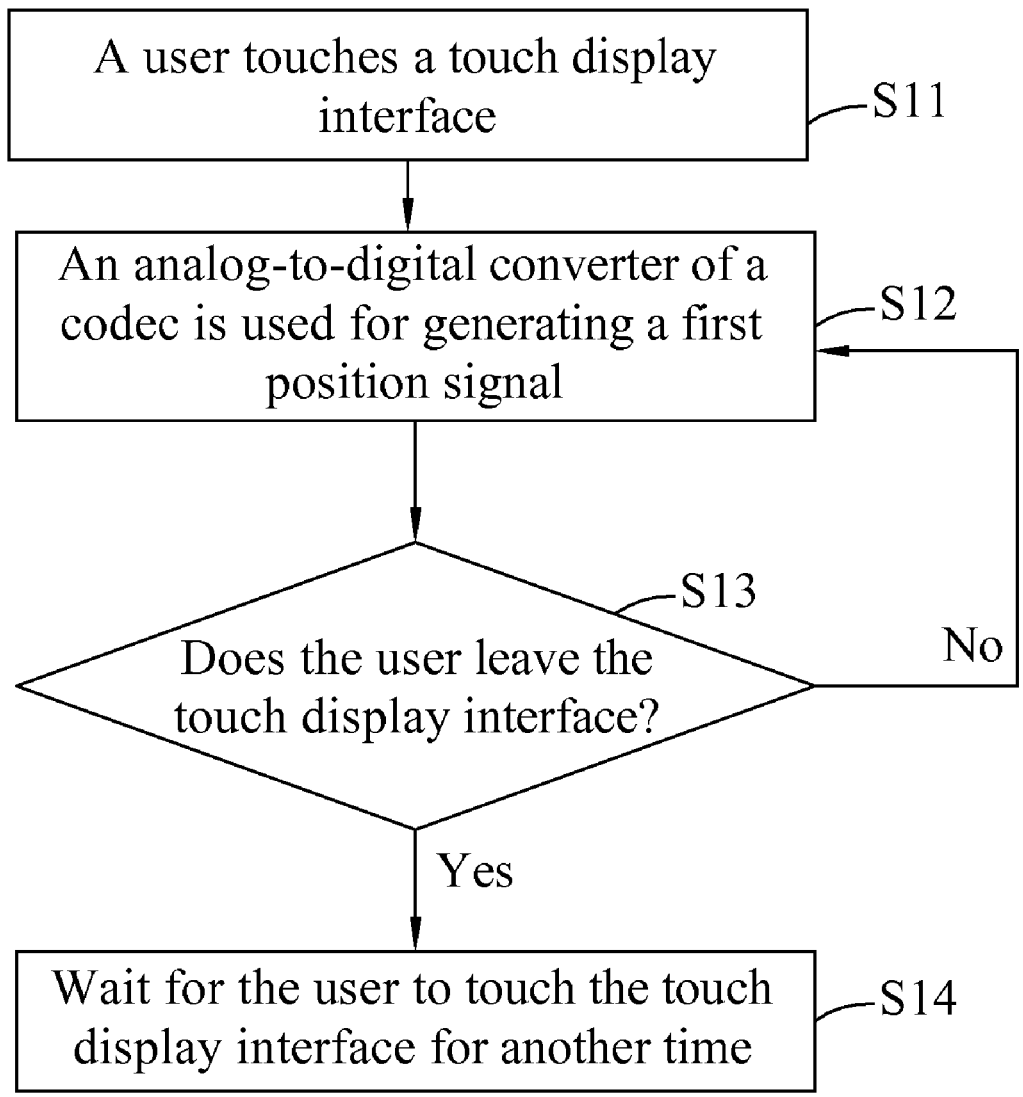
FIG. 1 is a flow chart of a conventional single touch method.
Figure 2:
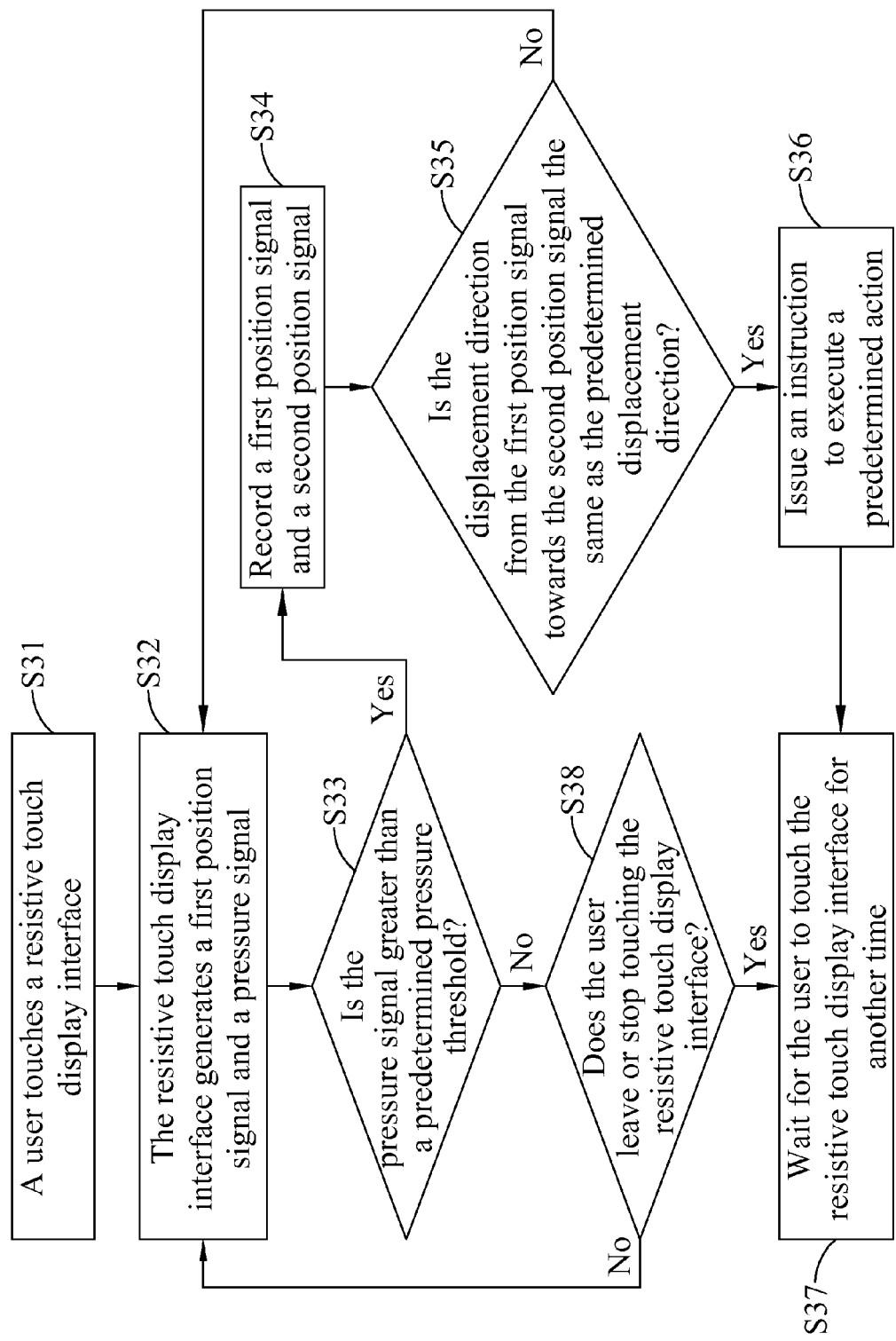
FIG. 2 is a flow chart of a method of multi-touch control of the present invention.

With reference to FIG. 2 for a flow chart of a method of multi-touch control of the present invention, the method of multi-touch control is applicable to a multi-touch controlled apparatus, an electronic device having a resistive touch display interface, such as a personal computer, a laptop, a personal digital assistant (PDA), a mobile phone or a global positioning system (GPS). In FIG. 2, the method comprises the following steps:

Step S31: A user (using one finger, two fingers, a touch pen or any other similar object) touches the resistive touch display interface.

Step S32: The resistive touch display interface is touched to generate a first position signal and a pressure signal. Since the structure of the resistive touch interface can generate one single position signal (or a single coordinate) only, when the user simultaneously touches a first touch point and a second touch point on the resistive touch interface, the resistive touch display interface will output an average of coordinates (X1, Y1) of the first touch point and coordinates (X2, Y2) of the second touch point (which are the coordinates of a middle position between the first touch point and the second touch point) to generate a first position signal. In addition, the first position signal or the pressure signal can be converted into a digital signal by an analog/digital converter of an encoder/decoder (or a codec).

Step S33: It is determined by a processing unit whether or not the pressure signal is greater than a predetermined pressure threshold; if yes, go to Step S34, wherein the touch made by a user is assumed to be a two-point touch (such as clicking by two fingers), or else jump to Step S38. The predetermined pressure threshold is preferably set according to a maximum possible pressure of a single touch point of a touch made by the user.

Step S34: A first position signal and a second position signal are stored into a storage unit, wherein the second position signal is generated in the same way of generating the first position signal. In other words, a user touches a first touch point and a third touch point (which is formed by moving the second touch point, e.g., with a first finger touching the first touch point and a second finger sliding from the second touch point to the third touch point) of the resistive touch display interface to output an average of coordinates (X1, Y1) of the first touch point and coordinates (X3, Y3) of the third touch point (which are the coordinates of a middle position between the first touch point and the third touch point) to generate the second position signal.

Step S35: It is determined by the processing unit whether or not the moving direction from the first position towards the second position is the predetermined moving direction (which may be a linear direction); if yes, then go to Step S36, or else jump to Step S32.

Step S36: An instruction is issued by the processing unit to execute a predetermined action, wherein the predetermined action includes zooming in a display screen, zooming out a display screen, or shifting a display screen in the moving direction from the first position towards the second position.

Step S37: The processing unit waits for the resistive touch display interface being touched by a user for another time.

Step S38: It is determined by the processing unit whether or not the user leaves and no longer touches the resistive touch display interface anymore. In other words, the processing unit determines whether or not the first touch point and the second touch point disappear, if yes, then go to Step S37, or else jump to Step S32.

The method of multi-touch control further comprises steps of recording the first position signal, second position signal, predetermined pressure threshold, predetermined moving direction or predetermined action in a storage unit, and by a processing unit, issuing the instruction, recording the first position signal into the storage unit, and determining whether or not the pressure signal is greater than the predetermined pressure threshold, or determining whether or not the moving direction from the first position towards the second position is the predetermined moving direction.

Figure 3:
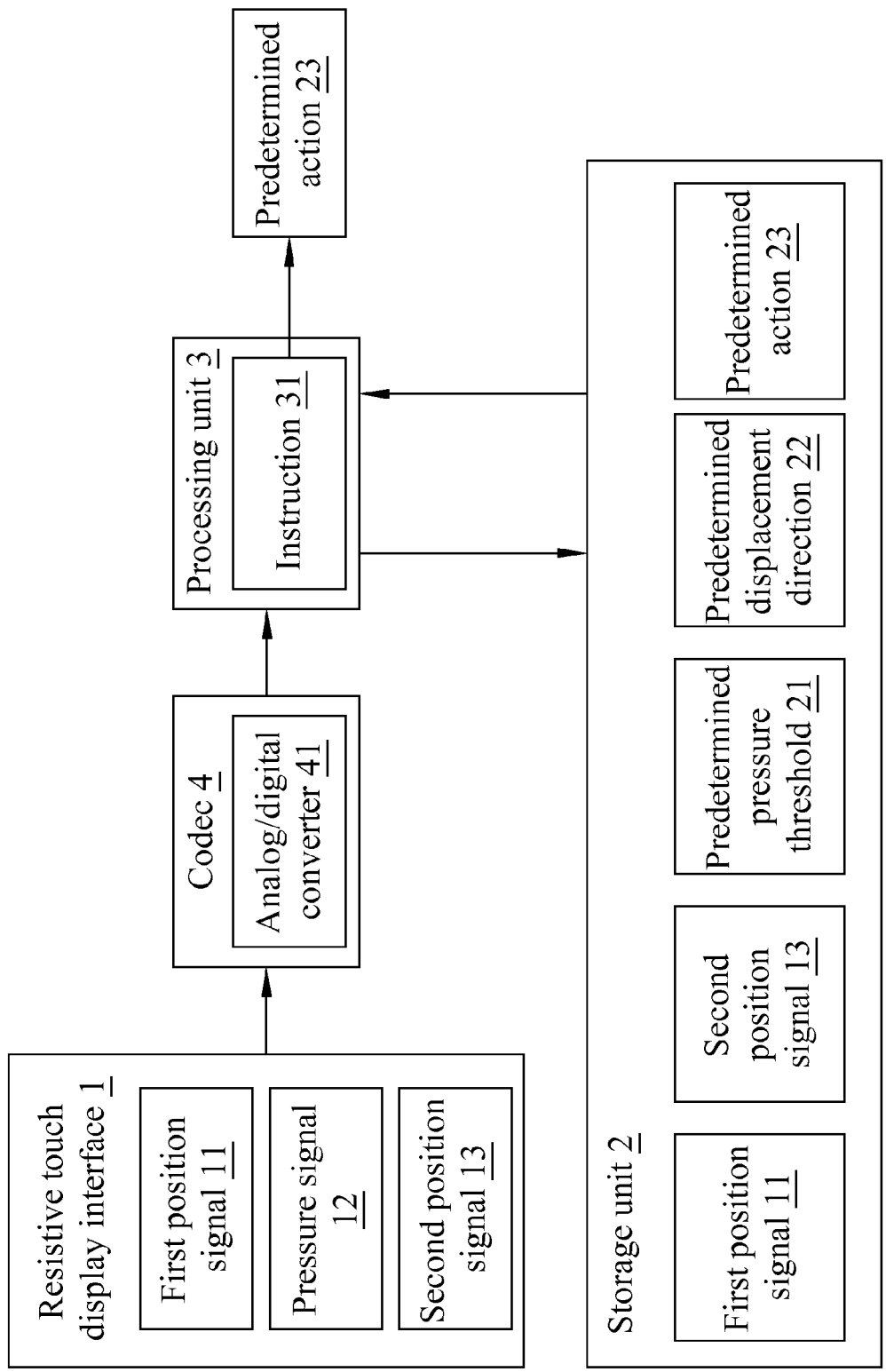
FIG. 3 is a block diagram of a multi-touch controlled apparatus of the present invention.

With reference to FIG. 3 for a block diagram of a multi-touch controlled apparatus in accordance with the present invention, the multi-touch controlled apparatus is an electronic device with a resistive touch display interface such as a personal computer, a laptop, a personal digital assistant (PDA), a mobile phone or a global positioning system (GPS). The multi-touch controlled apparatus comprises a resistive touch display interface 1, a storage unit 2 and a processing unit 3.

The resistive touch interface 1 is a resistive touch panel comprising a polyester film, and a conductive metal coating. The outermost layer of the resistive touch interface 1 is a polyester film, and a conductive metal coating is coated onto an internal side of the outermost layer. The lowest layer of the resistive touch interface 1 is attached onto a cathode ray tube (CRT) or a liquid crystal display (LCD)

The resistive touch display interface 1 generates a first position signal 11, a pressure signal 12 and a second position signal 13 while it is touched by a user (such as the user's finger, two fingers, touch pen or any other similar object). The resistive touch interface 1 is only able to generate a single position signal (which corresponds to a single coordinate) at one time, so that the resistive touch interface 1 can be touched by a user at a first touch point and a second touch point to output an average of coordinates (X1, Y1) of the first touch point and coordinates (X2, Y2) of the second touch point (which are the coordinates of a middle position between the first touch point and the second touch point) to generate the first position signal 11.

With reference to the way of generating the first position signal 11 for generating the second position signal 13, the resistive touch interface 1 can be touched by a user at a first touch point and a third touch point (formed by moving the second touch point, e.g., with a first finger touching the first touch point and a second finger sliding from the second touch point to the third touch point) to output an average of coordinates (X1, Y1) of the first touch point and coordinates (X3, Y3) of the third touch point (which are the coordinates of a middle point between the first touch point and the third touch point) to generate the second position signal 13.

The pressure signal 12 is the total pressure produced by the resistive touch display interface 1 touched by the user.

The first position signal 11, pressure signal 12 or second position signal 13 can be converted into a digital signal by an analog/digital converter 41 of an encoder/decoder 4 (or a codec).

The storage unit 2 is provided for storing the first position signal 11, second position signal 13, predetermined pressure threshold 21, predetermined moving direction 22 and predetermined action 23, wherein the predetermined pressure threshold 21 is preferably set according to a maximum possible pressure of a single touch point pressed by a user, and the predetermined moving direction 22 is a linear direction. In addition, the predetermined action 23 includes zooming in a display screen, zooming out a display screen, or moving a display screen in the moving direction from the first position towards the second position.

If the resistive touch display interface 1 is touched to generate the first position signal 11 and the pressure signal 12, the processing unit 3 will determine whether or not the pressure signal 12 is greater than the predetermined pressure threshold 21. Meanwhile, the touch made by the user is considered as a two-point touch (or two-finger touch), and then the processing unit 3 records the first position signal 11 and the second position signal 13 into the storage unit 2, and then the processing unit 3 determines whether or not the moving direction from the first position towards the second position is the predetermined moving direction 22 (which is a linear displacement). At this time, the processing unit 3 generates an instruction 31 to execute a predetermined action 23 of zooming in a display screen, zooming out a display screen, or moving a display screen in the moving direction from the first position signal 11 towards the second position signal 13, wherein the linear moving further includes a plurality of linear segments to form a curve displacement.

In this preferred embodiment, the processing unit 3 is a central processing unit (CPU), a micro control unit (MCU) or a micro processor unit (MPU).

If the moving direction from the first position towards the second position is not the predetermined moving direction (which is a linear displacement), then the analog/digital converter 41 of the multi-touch controlled apparatus will continue receiving the first position signal 11 and the pressure signal 12. If the third touch point is situated at the second touch point (since the third touch point can be used for moving, maintaining a position, or clicking the second touch point), then the processing unit 3 will issue another instruction to execute another action.

In the aforementioned preferred embodiment, if the pressure signal 12 is not greater than the predetermined pressure threshold 21, and the user stops touching the resistive touch display interface 1, then the processing unit 3 will wait for the resistive touch display interface 1 being touched by the user for another time. If the pressure signal 12 is not greater than the predetermined pressure threshold 21, and the user still touches the resistive touch display interface 1, then the analog/digital converter 41 of the multi-touch controlled apparatus will continue receiving the first position signal 11 and the pressure signal 12.

What is claimed is:

1. A method of multi-touch control, applicable to a multi-touch controlled apparatus, comprising the steps of:
generating a first position signal and a pressure signal while a resistive touch display is being touched at a first touch point and a second touch point, the first position signal representing a first position, and the first position being a middle position between the first touch point and the second touch point;
determining whether or not the pressure signal is greater than a predetermined pressure threshold while the resistive touch display is being touched at the first touch point and a third touch point; if yes, then storing the first position signal and a second position signal representing a second position, the second position being moved from the first position, and the second position being a middle position between the first touch point and the third touch point; and
determining whether or not a moving direction from the first position towards the second position matches a predetermined moving direction; if yes, then executing a predetermined action.

2. The method of multi-touch control of claim 1, further comprising an analog/digital converter for continuously receiving the first position signal and the pressure signal while the pressure signal is not greater than the predetermined pressure threshold, and the resistive touch display is continuously being touched.

3. The method of multi-touch control of claim 2, wherein if the moving direction from the first position towards the second position is not the predetermined moving direction, then the analog/digital converter continues receiving the first position signal and the pressure signal.

4. The method of multi-touch control of claim 2, wherein the first position signal, the second position signal or the pressure signal is converted into a digital signal by the analog/digital converter.

5. The method of multi-touch control of claim 1, wherein the third touch point is formed by moving the second touch point.

6. The method of multi-touch control of claim 1, wherein the predetermined moving direction is a linear direction.

7. The method of multi-touch control of claim 1, wherein the multi-touch controlled apparatus comprises a storage unit for storing the first position signal, the second position signal, the predetermined pressure threshold, the predetermined moving direction or the predetermined action in a storage unit.

8. The method of multi-touch control of claim 1, wherein the multi-touch controlled apparatus comprises a processing unit for generating the instruction, determining whether or not the pressure signal is higher than the predetermined pressure threshold, or determining whether or not the moving direction from the first position towards the second position matches the predetermined moving direction.

9. The method of multi-touch control of claim 8, wherein the processing unit is a central processing unit (CPU), a micro control unit (MCU) or a micro processor unit (MPU).

10. A multi-touch controlled apparatus, comprising:
a resistive touch display interface, arranged for generating a first position signal, a pressure signal and a second position signal, the first position signal representing a first position which is a middle position between a first touch point and a second touch point while the resistive touch display interface is simultaneously being touched at the first touch point and the second touch point, the second position signal representing a second position which is a middle position between the first touch point and a third touch point while the resistive touch display interface is simultaneously being touched at the first touch point and the third touch point, the second position being moved from the first position;
a storage unit, arranged for storing the first position signal, the second position signal, a predetermined pressure threshold, a predetermined moving direction and a predetermined action in storage unit; and
a processing unit, arranged for issuing an instruction;
wherein the first position signal and the pressure signal are generated while the resistive touch display interface is being touched, the processing unit determines whether or not the pressure signal is greater than the predetermined pressure threshold, if yes, the processing unit records the first position signal and the second position signal into the storage unit, and then the processing unit determines whether or not a moving direction from the first position towards the second position matches the predetermined moving direction; and if yes, the processing unit issues the instruction to execute the predetermined action.

11. The multi-touch controlled apparatus of claim 10, wherein if the pressure signal is not greater than the predetermined pressure threshold, and the resistive touch display interface stops being touched by a user, then the resistive touch display interface waits for being touched for another time.

12. The multi-touch controlled apparatus of claim 10, further comprising an analog/digital converter arranged for continuously receiving the first position signal while the pressure signal is not greater than the predetermined pressure threshold, and the resistive touch display interface is continuously being touched.

13. The multi-touch controlled apparatus of claim 12, wherein if the moving direction from the first position towards the second position is not the predetermined moving direction, then the analog/digital converter continues receiving the first position signal and the pressure signal.

14. The multi-touch controlled apparatus of claim 12, wherein the first position signal or the second position signal is converted into a digital signal by the analog/digital converter.

15. The multi-touch controlled apparatus of claim 10, wherein the third touch point is formed by moving the second touch point.

16. The multi-touch controlled apparatus of claim 10, wherein the predetermined moving direction is a linear direction.

* * * * *